United States Patent [19]

Smith

[11] 4,209,069
[45] Jun. 24, 1980

[54] DRILLS WITH CHIP COLLECTORS

[75] Inventor: Bruce W. Smith, Pacoima, Calif.

[73] Assignee: Lockheed Corporation, Burbank, Calif.

[21] Appl. No.: 502,901

[22] Filed: Sep. 3, 1974

[51] Int. Cl.² .............................................. B25D 17/14
[52] U.S. Cl. ...................................... 173/75; 175/209; 175/217; 408/58; 408/67; 408/241 B
[58] Field of Search ..................................... 173/63–65, 173/75, 60; 408/67, 56, 58, 241 B; 175/200, 209, 211, 212, 58, 60, 84; 15/339, 344; 144/252 R

[56] References Cited

U.S. PATENT DOCUMENTS

| | | | |
|---|---|---|---|
| 2,339,324 | 1/1944 | Fischer | 175/209 X |
| 2,420,905 | 5/1947 | Olsen | 408/56 |
| 2,527,968 | 10/1950 | Sherman et al. | 408/56 X |
| 3,368,633 | 2/1968 | Moates | 173/64 X |
| 3,511,322 | 5/1970 | Bixby et al. | 173/75 |
| 3,548,436 | 12/1970 | Henrich | 15/3.53 |
| 3,613,807 | 10/1971 | Galis | 175/209 |
| 3,843,198 | 10/1974 | Reynolds | 173/60 X |
| 3,850,254 | 11/1974 | Hirdes | 173/75 |

FOREIGN PATENT DOCUMENTS

| | | | |
|---|---|---|---|
| 203015 | 7/1907 | Fed. Rep. of Germany | 173/60 |
| 266630 | 3/1927 | United Kingdom | 173/60 |

Primary Examiner—William F. Pate, III
Attorney, Agent, or Firm—Lowell G. Turner

[57] ABSTRACT

A drill is disclosed having a shroud structure extending about a chuck and drill bit at the forward end of the tool, to receive cuttings produced by the bit, and having a receptacle preferably carried at the rear end of the drill and to which the cuttings are withdrawn by a flow of air. In one form of the invention, the air movement is induced by aspirator action, while in another form a rotary air pump driven by the motor of the drill creates the suction effect. The receptacle may take the form of a cup detachably connectible to the body of the drill, and in the aspirator form of the invention the aspirating passages may be formed in an end wall of this cup. The shroud structure may include a sleeve disposed about the drill bit, and having a lug projecting inwardly to a position to contact and break up cuttings formed by the bit before they are withdrawn to the accumulation receptacle.

18 Claims, 11 Drawing Figures

DRILLS WITH CHIP COLLECTORS

BACKGROUND OF THE INVENTION

This invention relates to portable rotary drills, and particularly to drills which are adapted to collect and retain the cuttings or chips formed by the drill bit in use.

In some situations in which hand drills are used, problems of serious magnitude can be encountered if the cuttings produced by the drill bits are allowed to remain in the vicinity of the work. For example, when drilling operations are performed during the assembly of an aircraft, chips formed by the drill may fall into an electrical "harness" or other wiring assembly, to positions at which the sharp edges of the chips may cut through the insulation of the wiring under the effect of vibrations encountered when the plane is in flight. In this or any of various other ways the chips may directly or indirectly cause short circuits in the wiring of an aircraft or the like, which may ultimately result in a serious accident or damage to the equipment. In other instances, the chips may fall into a sealant material, adhesive, or other substance, which subsequently cures or dries to a hardened condition in which it may permanently retain the cuttings at locations leaving their sharp edges exposed for contact with clothing, persons or equipment which might be damaged by the sharp edges. Even where actual harm may not result from the cuttings, it is still desirable in aircraft to remove the cuttings, if only for the purpose of eliminating excess weight on the craft. In other non-aircraft drilling situations, as for instance in and around a home or business establishment, cuttings produced by a drilling operation may be inconvenient to remove, and often detrimental to carpets, drapes, or other furnishings.

There have in the past been proposed various types of drills in which a suction effect has been utilized for withdrawing cuttings produced by the drill bit to a bag or other accumulation receptacle. For example, in U.S. Pat. Nos. 2,339,324, 2,246,916 and 2,349,156, there is shown a type of arrangement in which a housing is disposed about the chuck and bit of a drill and is connected by a flexible hose to an aspirator and collection bag formed separately from the drill, with the aspirator serving to draw air and entrained chips from the location of the bit into the bag. Similarly, U.S. Pat. No. 1,955,182 shows a boring machine having a motor driven fan which creates a flow of air to remove cuttings. Other drill devices having suction systems are shown in U.S. Pat. Nos. 994,430 and 3,351,143.

Each of these prior suction type devices of which I am aware has had one or more disadvantages inherently limiting its practical usefulness in an actual industrial or commercial environment. For example, one very serious disadvantage of all of these devices has resided in the extremely cumbersome character of the suction equipment, necessitating the provision of space in the vicinity of the drilling operation for reception of a separate chip collection bag or the like, which bag must in most instances be handled separately from the drill itself, thus precluding use of the drill in many of the confined spaces in which drilling must be performed in the assembly of an aircraft. Such separately formed suction equipment must also be relatively expensive to manufacture, and increase the cost of the overall drilling assembly to a point rendering it impractical for many uses. In addition, in most instances the suction equipment has required separate controls, needlessly complicating the operation of the equipment by requiring the suction equipment and the drill proper to be turned on and off separately at each use.

SUMMARY OF THE INVENTION

The present invention provides a drill having a suction type chip collector of the above discussed general character, but in which the drill and chip collector together form an extremely compact unitary structure, having a size and handling characteristics closely approximating those of a simple drill, thereby enabling use of this overall unit in virtually any type of confined space in which a simple drill may be employed. At the same time, the suction effect attained is extremely positive in operation, to assure substantially complete removal of all of the chips or cuttings from the vicinity of a work piece while a hole is being drilled therein. In addition, the special suction equipment is very easily detachable from the main body of the drill, to allow ready access to the chuck of the drill for removal and replacement of bits, and to allow detachment of the chip receiving receptacle for emptying after a period of use.

The facility of manipulation of the device in confined spaces results in large part from formation of the chip receptacle as a cup secured to a rear end of the body of the drill, that is, at an end facing in a direction away from or opposite to the forward direction in which the drill chuck and bit project. The cuttings are conducted from a forward shroud about the chuck to the rear chip receptacle through a conduit which may extend along the outside of the drill body and past the location at which the motor of the drill is carried. A handle by which the tool is manipulated may project from the body of the drill at a location intermediate its discussed forward and rear ends.

The forward shroud and rear collector cup may be held on the body by appropriate retaining means, desirably including an element which interconnects these two parts in a manner preventing their separation and thereby holding both parts in place. This element may be a swinging U-shaped retainer having two arms pivotally attached at their forward ends to the front shroud of the device, and having a rear portion with a cross piece which can swing into and out of an active position of engagement with and extension across the back of the chip collecting cup.

In one form of the invention, the drill is driven by an air motor, and some of the air supplied to the motor is directed through an aspirator as a primary flow of air, for including a secondary flow of air and entrained chips from the forward shroud into the chip receptacle. The aspirator may receive its primary air through a tube projecting rearwardly from the body, and telescopically connected to a tubular element in the cup, with aspirator passages being formed in a rear end wall of the cup. The air may discharge from the aspirator structure through a passage or passages formed in and extending through the side walls of the cup, and exhausting to atmosphere at a forward open end of the cup. This forward end is connectible to the body of the gun in sealed relation maintaining a sealed vacuum chamber in the cup. The aspirator may take suction from this chamber, through a filter acting to prevent flow of any of the cuttings to the aspirator.

Another form of the invention employs a drill having an electric motor driving both the chuck and a rotary vacuum pump, with the latter being used to create the suction for producing the main flow of air and cuttings from the vicinity of the work piece to the chip receptacle. In this instance, a filter may be carried by the body of the drill, at a location between the chip receptacle and vacuum pump, but still, as in the first form of the invention, at the downstream side of the receptacle chamber itself.

When a hole is drilled in certain types of metal, such as for example aluminum, there is a tendency in some instances to form long twisted or curled cuttings which are too large for easy vacuum removal to a collection receptacle. In order to facilitate removal of these cuttings from the vicinity of the work piece, the present invention contemplates provision of means for breaking up such elongated strips of material into smaller chips. More particularly, there is for this purpose provided within the interior of a tubular sleeve disposed about the rotary drill bit a lug or lugs projecting inwardly from that sleeve and toward the drill bit to a position to contact the cuttings and break them up into chips of relatively small size. In the preferred arrangement, two such lugs project radially inwardly from the sleeve at diametrically opposite locations, with the rotation of the drill bit acting to produce sufficient movement of the cuttings relative to these lugs to effectively break them up.

Another feature of the invention resides in the provision of slits of a particular type in the sleeve surrounding the bit, for introducing inlet air into the sleeve in optimum fashion. These slits are elongated and disposed generally transversely of the axis of the drill bit, but are inclined to advance progressively in an axial direction toward the body of the drill as the slits advance radially inwardly toward the bit. It is found that such slits confine the cuttings against movement radially out of the sleeve, and yet by virtue of their elongated configuration do not become clogged by the cuttings, and by virtue of their inclination in conjunction with the other structural characteristics direct incoming air for optimum flow inwardly along the bit, and preferably then past the discussed break-up lugs, for withdrawal by the suction equipment.

The forward shroud of the device may extend about a forward portion of the drill body from which air driving a motor of the drill discharges. In that case, an additional feature of the invention relates to the formation of an annular fluid tight seal between the shroud and the tool body at a location forwardly of that discharge air, to isolate such exhausting air from the chip suction air. The motor exhaust air may discharge from the shroud through apertures formed in the shroud, with two spaced seal rings preferably being carried by the body of the drill, one located forwardly of the exhaust outlets in the tool body and the other rearwardly of those outlets, to confine the flow of exhaust air axially between the seals.

The shroud may be connectible to the body by movement rearwardly relative to the bit and chuck to an assembled position of reception thereabout. In the preferred forms of the invention, this rearward movement also serves to move a chip delivery tube carried by the shroud rearwardly into telescopically interfitting engagement with a coacting fitting carried by a rear portion of the body, from which fitting the suction air and carried chips are delivered to the collection cup.

BRIEF DESCRIPTION OF THE DRAWINGS

The above and other features and objects of the invention will be better understood from the following detailed description of the typical embodiments illustrated in the accompanying drawings, in which.

DESCRIPTION OF THE PREFERRED EMBODIMENTS

Figure 1:
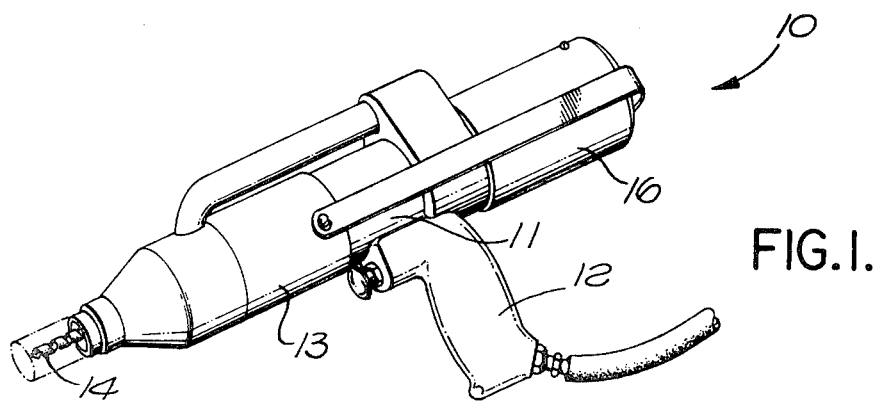
FIG. 1 is a perspective view of a first form of drill embodying the invention.

Referring first to FIG. 1, I have shown at 10 a first form of drill embodying the invention, having a main body 11 with a handle 12 by which the drill is held in use. To the forward end of body 11 there is mounted a shroud assembly 13 to be received about and enclose the drill bit 14 (FIG. 2) and chuck 15 carrying the bit. The rear end of body 11 carries a chip receptacle or cup 16 within which cuttings taken from a work piece are collected.

The main body 11 and its contained parts may be essentially conventional, except insofar as those parts have been altered to receive and connect to shroud 13 and cup 16. More particularly, body 11 may have an upper portion 17 containing a conventional air motor 18 whose rotor is driven rotatably by air from a compressed air supply hose 19 about an axis 20 which extends horizontally in the FIG. 2 position of the tool. The rotor of motor 18 may be of the usual vaned type. Air supply hose 19 connects into the lower end of handle 12, and communicates through a passage 21 in the handle with a valve 22 carried by the handle and controlled by a finger actuated rearwardly movable trigger element 23. When trigger element 23 is actuated rearwardly, air from passage 21 is delivered through valve 22 to a main air inlet passage leading to motor 18, and also through a second passage 25 in body 11 leading to a tubular fitting 26 connected into the back side of body 11. Air which is exhausted from the motor 18 after driving its rotor discharges forwardly through a number of apertures 27 formed in three forwardly facing surfaces 28 on the body. An annular O-ring 29 carried in an annular external groove 30 formed in the body just rearwardly of the apertures 27 is engageable with an internal cylindrical surface 31 of a main shroud part 32 of the shroud assembly 13 in annular sealing relation, to confine the exhaust air against movement rearwardly past seal ring 29.

The conventional chuck assembly 15 has a spindle portion 33 which projects rearwardly into a mounting part 34 having external threads 35 screwed into a tubular forwardly projecting portion 36 of body 11. Part 34 contains an appropriate bearing or bearings represented at 137 journaling spindle 33 and the rest of the chuck 15 for rotation about axis 20. In addition, part 34 may contain a reduction gear assembly for reducing the speed of rotation of the chuck relative to that of the rotor of motor 18.

Figure 6:
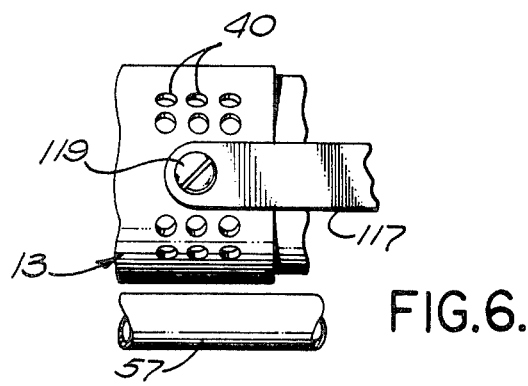
FIG. 6 is an enlarged fragmentary side view taken on line 6—6 of FIG. 3.

Externally, part 34 contains an annular groove 37 within which there is received an annular elastomeric O-ring 38 annularly engageable with the inner cylindrical surface 31 of part 32 to form an annular fluid tight seal at a location forwardly of the air exhaust apertures 27, to thereby confine the motor exhaust against forward movement beyond the location of ring 38. The external surface 39 of the forwardly projecting portion 20 of body 11 is somewhat similar than the internal diameter of shroud surface 31, to allow free flow of the discharge air from apertures 27 about surface 39 and to the location of air exhaust openings 40 (FIG. 6) formed in a side of the shroud. The external surfaces 41 formed on part 34 forwardly of surface 39 may be just slightly smaller in diameter than 31. A passage 231 may extend radially inwardly through part 34 to vent to atmosphere any air which may escape from the motor along its driven shaft.

The main part 32 of the shroud assembly 13 may be formed of two rigidly connected sections 42 and 43 joined together at 142. The first of these sections 42 may be a simple straight cylindrical tube containing the previously mentioned internal surface 31 of the shroud, while the second of the sections 43 is an externally tapering nose part having a reduced diameter surface 143 about which part 42 is received in tightly fitting and sealed relation. In extending forwardly from the location 142 of juncture of the two sections of shroud part 32, the outer surface of forward section 43 may first extend cylindrically at 44, then taper conically at 45, and then extend cylindrically at 46. Internally, part 43 has a first cylindrical surface 47 received in close proximity to the external cylindrical surface 48 of a forward part 49 of the chuck assembly 15. Forwardly of surface 47, the interior of part 43 tapers conically at 50 in close proximity to a correspondingly tapered surface 51 of chuck part 49, and then extends directly axially to form a straight cylindrical surface 52 centered about main axis 20 of the tool. A tubular spring retainer element 53 may be contained within a rear portion of this cylindrical passage 52, being locked therein by a set screw 54, and acting to engage the rear end of a coiled compression spring 55 which yieldingly urges a sleeve 56 forwardly relative to the main shroud element 32. A rigid chip removal tube 57 has an inclined forward portion 58 connected rigidly into an inclined passage 59 in element 43, to communicate through a reduced diameter portion 60 of that passage and an opening 61 in tube 53 with the interior of the nose piece 43, for reception of chips therefrom. Tube 57 curves progressively rearwardly at 62, and then forms a straight cylindrical tubular portion 63 centered about an axis 64 which is parallel to the main axis 20 of the tool and shroud. An inclined cleanout opening 160, closed by a threaded plug 161, may be provided in part 43 at a location opposite and in alignment with passage 60 and portion 58 of tube 57, to allow a tool to be advanced into and through tube 57 to clean it out.

The sleeve 56 is disposed about and speaced radially from, and concentric with respect to, drill bit 14, and has an internal cylindrical surface 64 centered about axis 20. This external cylindrical surface 65 is also centered about axis 20, from the location of a forward transverse end face 66 of sleeve 56 to a rear annular externally enlarged flange 67 slidably received within bore 52, and retained against forward or leftward movement beyond the position of FIG. 2 by an inturned flange 68 on part 43. Thus spring 55 normally urges sleeve 56 to its FIG. 2 forwardly projecting position, but allows rearward retraction of the sleeve relative to the drill bit and the body of the tool as the drill bit advances into a work piece.

Figure 8:
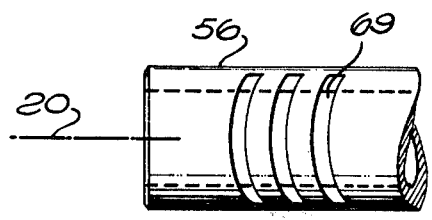
FIG. 8 is an enlarged fragmentary plan view taken on line 8—8 of FIG. 2.

For admitting air into sleeve 56 when the tool is in use, the side wall of sleeve 56 contains two diametrically opposite series of slits 69. As will be apparent from FIGS. 2 and 8, these slits are elongated, with their lengths disposed essentially transversely of the main axis 20 of the drill, and with these slits inclined at an oblique angle a with respect to axis 20. As a result of this inclination, the slits advance progressively in a rearward axial direction (rightwardly in FIG. 2) as they advance radially inwardly toward axis 20, to define a smooth air flow path facilitating entrainment of cuttings by the air for delivery rearwardly through the shroud assembly. The individual slits of each of the two series are disposed parallel to one another, and may be formed by merely making a series of saw cuts in the sleeve in as many parallel planes 70. When viewed as in FIG. 8, the slits may be considered as having an essentially chevron shaped configuration.

Rearwardly of the air intake slits 69, sleeve 56 carries one or more pins 71 (preferably two pins at diametrically opposite locations) connected rigidly into openings in the side wall of the sleeve and projecting radially inwardly beyond inner surface 64 and toward drill bit 14 to form inwardly projecting lugs acting to break up any excessively large cuttings which attempt to pass the pin locations.

Figure 2:
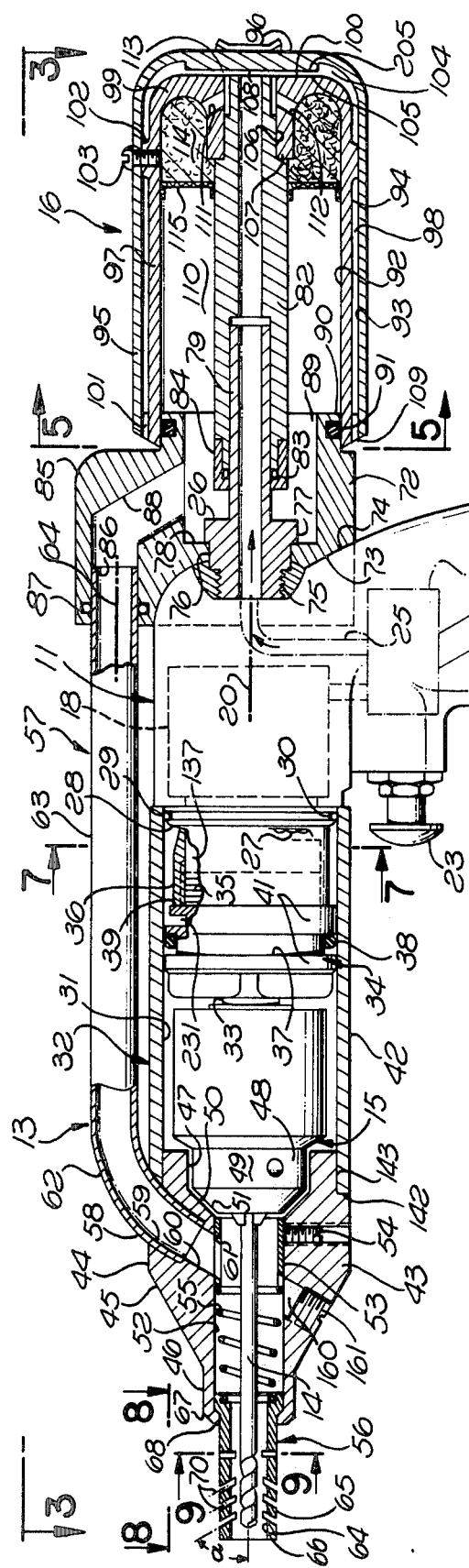
FIG. 2 is an enlarged view of the FIG. 1 drill, shown partly in side elevation but primarily in axial section.
Figure 7:
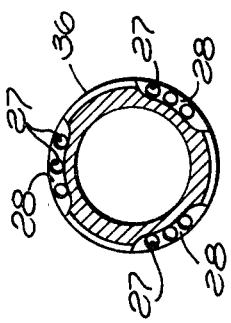
FIG. 7 is a transverse section taken on line 7—7 of FIG. 2.

For detachably connecting the chip receptacle or cup 16 to the back of gun body 11, the body rigidly carries an adapter part 72, which may have a forward face 73 contoured to fit the back end surface 74 of a conventional drill body. Alternatively, the structure shown as the separate part 72 in FIG. 2 may if desired be formed integrally with the remainder of the body 11. In FIG. 2, the adapter 72 is illustrated as retained in position by the previously mentioned tubular element 26, which is threadedly connected to body 11 at 75, and has a somewhat larger diameter portion 76 received within an opening in part 72, and an externally hexagonal portion 77 tightenable by a wrench against a surface 78 in part 72. A rearwardly projecting tubular portion 79 of part 26 is centered about main axis 20 of the tool, and has an outer cylindrical surface telescopically received within an inner cylindrical surface formed within a tube 82 carried by cup 16. An elastomeric O-ring 83 secured to tube 82 by a retaining element 84 engages the outer surface of tube 79 to form a fluid tight seal therewith.

An upwardly projecting portion 85 of adapter part 72 contains a forwardly facing socket recess 86 having a straight cylindrical internal wall of a diameter just slightly larger than the external diameter of the straight cylindrical portion 63 of tube 57, with an O-ring 87 provided in a groove in a side wall of socket recess 86 to form a seal with tube 57. As will be apparent, the cylindrical socket recess 86 is centered about axis 64 which is parallel to axis 20.

Air and cuttings leaving the rear end of tube 57 flow through an inclined passage 88 in part 72, and discharge through the end of that passage into a chamber 89 opening rearwardly into the interior of cup 16. A rearwardly projecting annular flange 90 on part 72 carries an elastomeric seal ring 91 within an external groove in the flange for sliding engagement with an internal straight cylindrical surface 92 of the cup, to form an annular seal therewith.

Figure 5:
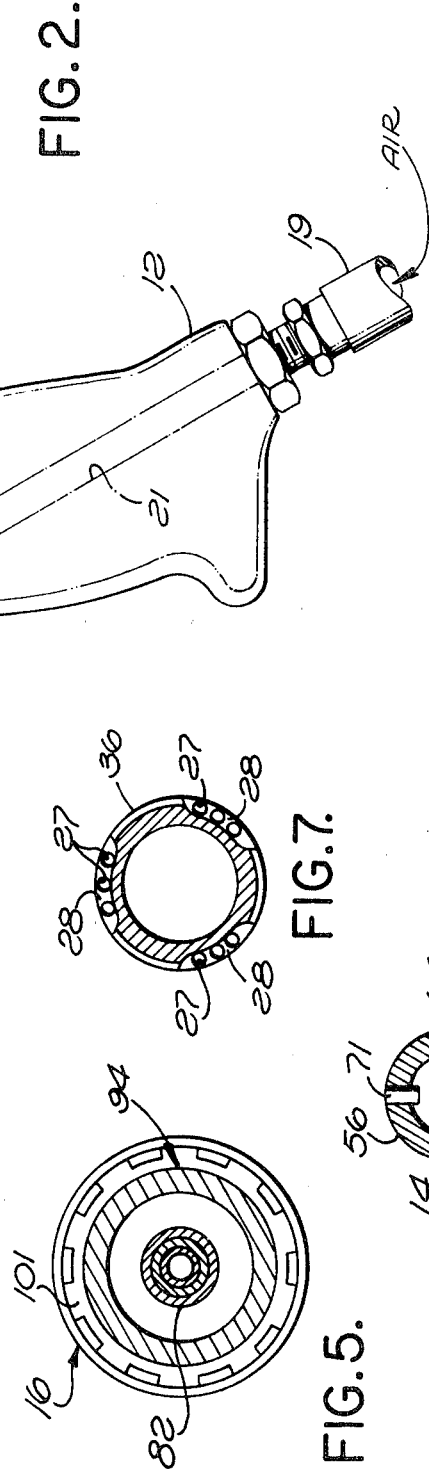
FIG. 5 is a transverse section taken on line 5—5 of FIG. 2.
Figure 9:
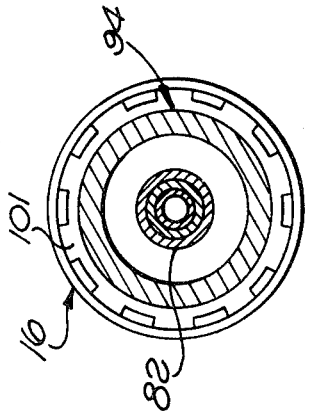
FIG. 9 is an enlarged transverse section taken on line 9—9 of FIG. 2.

In the FIG. 2 form of the invention, the chip receptacle or cup 16 may be formed of three rigidly interconnected sections, including the previously mentioned central tube 82, an outer cup shaped part 93, and an inner cup shaped part 94. The outer part 93 has a straight cylindrical side wall 95 centered about axis 20 and merging at its rear end with a transverse end wall 96. The inner cup has a similar straight cylindrical side wall 97 disposed parallel to but spaced inwardly from wall 95 to form a narrow annular passage 98 therebetween, and a transverse end wall 99 disposed parallel to but spaced from end wall 96 to form a passage therebetween. A series of circularly spaced lugs 101 (FIG. 5) on inner part 94 maintain the two cups in appropriately concentric positions, in conjunction with a similar series of circularly spaced lugs 102 rearwardly of the lugs 101. A screw 103 or other fastener may extend through the two cups at the location of one of the lugs to retain them against axial separation. The spacing at 100 axially between the inner portions of the two opposed radial surfaces 105 and 205 at the ends of parts 93 and 94 is desirably somewhat less than the spacing at 104 between the radially outer portions of surfaces 105 and 205, and the spacing at 98, and is dimensioned to attain an effective aspirator action as will be discussed hereinbelow.

Tube 82 is rigidly connected to the inner cup shaped part 94 of receptacle 16 by reception of a reduced diameter portion 106 of tube 82 within a tubular portion 107 of part 94. This engagement of the two parts may be a tight pressed fit to retain them together and at the same time form an annular fluid tight seal between the parts. Compressed air from within the interior of tube 82 discharges from the right end of that tube, and passes radially outwardly therefrom through a narrow annular gap 108 between the end of tube 82 and the opposed radial surface 205 on the end portion 96 of part 93. This primary flow of air continues radially outwardly through the previously mentioned gap 100, and then curves leftwardly through the gap 98 to discharge to atmosphere at 109.

The discussed primary flow of air induces a secondary flow of air by aspirator action from the main inner chamber 110 in receptacle 16 through a number of circularly spaced passages 111 formed in the tubular portion 107 of part 94, and then through an annular axially extending passage 112 to a point of admixture at location 113 of FIG. 2 with the radially outwardly flowing primary stream of air. The secondary flow of air in approaching the aspirator passes through an annular body of filtering material 114 contained within the end of part 94, to retain the chips within chamber 110 and prevent their flow into the aspirator passages. Filter material 114 may be an appropriate porous sponge material, such as a suitable open pored polyurethane foam sponge. An annular screen 115 at the entrance side of the filter material 114 prevents the chips from entering the pores of and clogging the sponge material itself.

Figure 3:
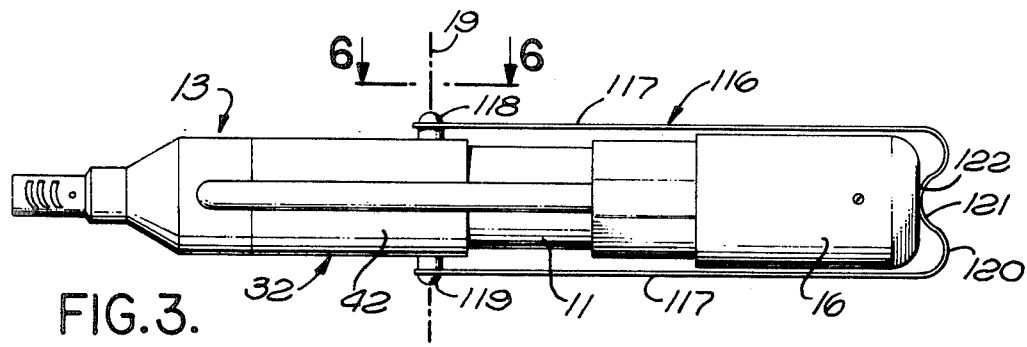
FIG. 3 is a reduced plan view taken on 3—3 of FIG. 2.
Figure 4:
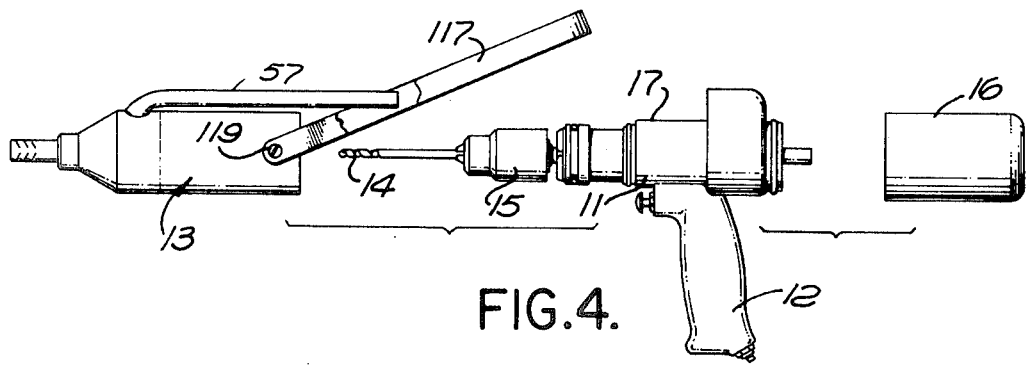
FIG. 4 is a view on a further reduced scale showing the forward shroud and rear chip receptacle separated axially from the main body of the gun.

For detachably retaining both the chip receptacle 16 and forward shroud assembly 13 on body 11, I preferably utilize a U-shaped retainer 116 (FIG. 3), desirably formed of spring material, and having two spaced parallel arms 117 extending along opposite sides of body 11 and pivotally connected at 118 and 119 to shroud part 42 for swinging movement about and axis 19 disposed transversely of and intersecting main axis 20 of the tool. At the rear end of body 11, the U-shaped retainer 116 has a cross piece 120, with a resilient forwardly bent central portion 121 which is frictionally engageable with the transverse planar rear surface 122 of the receptacle 16 when retainer 116 is in the active holding position of FIGS. 2 and 3. In this condition, the resilience of portion 121 of part 116 yieldingly urges receptacle 16 forwardly relative to body 11 to retain it against separation from the body 11, and at the same time to retain the shroud assembly 13 against forward detachment from the body.

In using the tool of FIGS. 1 through 9, an operator grasps handle 12 and manipulates it to position drill bit 14 for forming a hole in a work piece, with the end of sleeve 156 bearing against the work piece about the location at which the hole is to be formed. The sleeve thus serves the dual purposes of exerting force against the work piece to maintain it in position, and at the same time providing an air flow path rearwardly past the outside of the drill bit. When the operator the actuates trigger element 23, this simultaneously energizes motor 18 to commence rotation of the drill bit, and admits air through tubes 79 and 82 to the aspirator structure at the rear end of receptacle 16. The aspirator thus commences flow of air through slits 69 in sleeve 56 into the interior of the sleeve, then rearwardly through the sleeve and shroud to tube 63, and then through passage 88 into chamber 110 in the chip receptacle, with ultimate discharge of the air through passage 98 in the side wall of the receptacle to the location 109. As the drilling operation commences, chips are drawn along this secondary flow path into chamber 110, to accumulate therein, with any large cuttings being broken up by the action of lugs 71 in sleeve 56, which lugs tend to remain stationary while the bit and cuttings turn relative to the lugs to cause the break-up action. After a number of uses, receptacle 16 may be freed for removal by swinging retainer 116 upwardly to the position of FIG. 4, which allows receptacle 16 to be pulled rightwardly to the position illustrated in FIG. 4, so that the chips can be removed from the receptacle and the latter then be replaced for further use. Such release of the retainer 116 also permits leftward axial withdrawal of the shroud assembly 13 to its FIG. 4 position, to expose the chuck and bit for replacement of the bit when necessary.

When the tool is in use, the closely proximate relationship of surfaces 47 and 50 to the outer annular surfaces 48 and 51 of chuck part 49 prevents chips from moving rearwardly along the outside of the chuck. Also, the two seal rings 29 and 38 carried by the body structure isolate the motor discharge air between these rings; and the forward ring 38 prevents intermixing of the motor discharge air with the secondary flow of suction air to the chip receptacle.

Figures 10, 11:
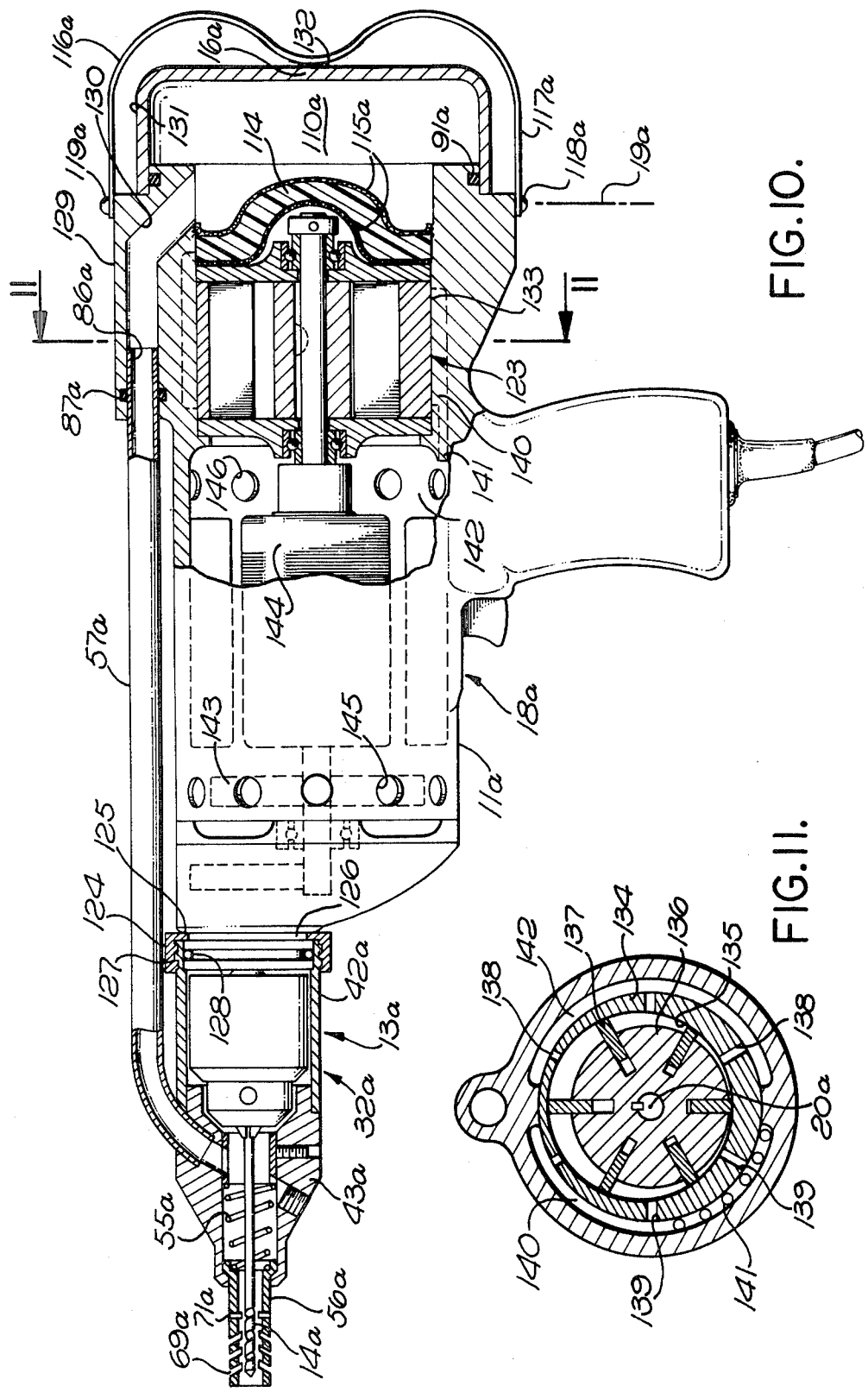
FIG. 10 is a view similar to FIG. 2 but showing a variational form of the invention.
FIG. 11 is a transverse section taken on line 11—11 of FIG. 10.

The second form of the invention shown in FIGS. 10 and 11 is basically very similar to the FIGS. 1 through 9 form, except that the motor 18a carried by body 11a of FIGS. 10 and 11 is an electric motor rater than a pneumatic motor, and the secondary flow of suction air is produced by a rotary vacuum pump 123 driven by the electric motor in lieu of the aspirator arrangement of FIGS. 1 through 9. The forward shroud assembly 13a of FIG. 10 includes a shroud proper 32a formed of a tubular part 42a and a forward nose piece 43a and carrying a forward sleeve 56a received about drill bit 14a. Sleeve 56a is yieldingly urged forwardly by a coil spring 55a, and has air inlet slits 69a and inwardly projecting chip breakup lugs 71a. In lieu of the retainer 116 of the first form of the invention, the shroud part 32a is illustrated as retained by a ring or nut 124 having an annular inwardly projecting portion 125 located and confined within a groove 126 formed in the outside of tool body 11a, and threadedly engaging the rear end of shroud part 31a at 127, with an annular seal being formed by an O-ring 128.

The rear portion of handle body 11a may be shaped to form an upper projection 129 forming a forwardly facing internally cylindrical socket recess 86a into which the rear end of chip delivery tube 57a is telescopically receivable in response to the same rearward movement of shroud assembly 13a which positions that shroud about the cutter 14a and chuck 15a. A seal ring 87a forms a fluid tight seal between tube 57a and portion 129 of the tool body. From the socket recess 86a, the suction air and entrained chips pass rearwardly and downwardly through a passage 130 into the interior of a rigid chip receptacle or cup 16a, having a cylindrical side wall 131 and transverse end wall 132. The receptacle 16a may be retained by a U-shaped retainer spring 116a having its two parallel arms 117a pivoted to body 11a at 118a and 119a for swinging movement about an axis 19a between the illustrated cup retaining position and a released position permitting removal of the cup 16a from the body. An annular O-ring 91a forms a fluid tight seal between the cup and the body to enable a sub-atmospheric pressure to be maintained within chamber 110a in the receptacle.

From chamber 110a, air is drawn forwardly through an annular body of filtering material 114a, typically foam or the like, retained between two annular wire screens 115a. The vacuum pump 123 may be contained within a chamber or recess 133 formed within the interior of drill body 11a, and may be a conventional vane type fluid pump having an annular outer housing or stator 134 (FIG. 11), containing an inner cylindrical chamber 135 which is eccentric with respect to the main axis 20a about which a rotor 136 carrying circularly spaced radially movable vanes 137 turns. Air from chamber 110a within receptacle 16a enters the interior of pump stator 134 through an inlet passage or series of passages represented at 138 in FIG. 11, and is forced through the pump and out discharge openings 139 into a space 140 at the outside of the stator, which space communicates through passages 141 with chamber 142 within which motor 18a is contained. The inlet air reaches passages 138 through a chamber 142 formed at the outside of pump stator 134, which chamber is in communication with the radially outer edge of the filter material 114a. The air from chamber 110, after entering the filter material 114a may flow radially outwardly therethrough to the periphery of the filtering material for delivery through passage 142 to the pump.

The air discharging from pump 123 through passages 141 may be drawn forwardly by a fan 143 carried and driven by the armature 144 of motor 18a, to be discharged from body 11 through appropriate outlet openings illustrated at 145. Additional air for cooling the motor may enter body 111 through openings 146 at the rear of the motor, for mixture with the air from passages 141.

In use, the tool of FIGS. 10 and 11 is manipulated in essentially the same manner described in connection with the first form of the invention, with cuttings being drawn rearwardly through sleeve 56a and shroud 32a, into and through tube 57a and body passage 130 to collection chamber 110a within receptacle 16a. The cuttings may be removed from this receptacle periodically, and the forward shroud assembly 13a may be removed whenever necessary to replace or repair the drill bit.

While certain specific embodiments of the present invention have been disclosed as typical, the invention is of course not limited to these particular forms, but rather is applicable broadly to all such variations as fall within the scope of the appended claims.

I claim:
1. A portable drill comprising:
   a body containing a motor;
   a rotary chuck driven by said motor and adapted to hold a drill bit at a forward end of the body, and to turn the bit about an axis;
   a shroud disposed about said chuck and drill bit at said forward end of said body;
   a chip receptacle removably carried by said body at an opposite rear end of the body, rearwardly beyond said motor;
   a handle projecting from said body intermediate said shroud and said receptacle;
   a vacuum pump carried by said body and driven by said motor for producing a primary flow of air;
   aspirator means carried by said receptacle and energized by said primary flow of air to induce a flow of secondary air and entrained chips from the vicinity of said drill bit through said shroud and then rearwardly to said receptacle; and
   means for causing said primary flow of air to circulate past and cool said motor prior to discharge to atmosphere.

2. A drill as recited in claim 1, in which said receptacle is a rigid cup having a forwardly facing open end which is movable axially forwardly relative to said body and into sealed relation with respect thereto.

3. A drill as recited in claim 1, in which said receptacle contains an inner chamber for receiving said chips and has a wall disposed about said chamber and containing a passage through which said flow of air passes and is discharged to the atmosphere after leaving said chamber.

4. A drill as recited in claim 1, in which said last mentioned means include a chip delivery tube extending rearwardly from said shroud alongside said body and past said motor and delivering chips to said receptacle.

5. A drill as recited in claim 1, including means for cooperatively connecting said receptacle to said shroud in a relation retaining said receptacle against detachment from the body.

6. A drill comprising:
   a body;
   a motor carried by said body;
   a rotary chuck driven by said motor and adapted to hold a drill bit and turn it about an axis;
   a sleeve movably mounted directly to said body at a location to extend about the entirety of said drill bit, said sleeve movable along said axis of said drill;

means for producing a flow of air through said sleeve acting to withdraw chips by vacuum along a predetermined path from the location of the bit to a collection location; and lug means carried by said sleeve and projecting inwardly therefrom toward the bit and operable to engage and break up chips produced by the bit to facilitate their removal by said flow of air.

7. A drill as recited in claim 6, in which said sleeve has a side wall which is apertured forwardly of said lug means for passage of said flow of air thereinto.

8. A drill comprising:
a body;
a motor carried by said body;
a rotary chuck driven by said motor and adapted to hold a drill bit and turn it about an axis;
a sleeve movably mounted to said body at a location to extend about the entirety of said drill bit, said sleeve movable along said axis of said drill; and
means for producing a flow of air through said sleeve acting to withdraw chips by vacuum along a predetermined path from the location of the bit to a collection location;
said sleeve having a side wall containing elongated slits through which said flow of air enters the sleeve, said elongated slits having their lengths disposed generally transversely of said axis, and being inclined to advance progressively in a rearward axial direction as they advance radially inwardly toward the bit.

9. A drill comprising:
a body containing a motor driven by air;
a rotary chuck driven by said motor and adapted to hold a drill bit and turn it about an axis;
a shroud removably receivable about said chuck and having a rear portion slidably receivable about a forward portion of said body;
means for producing a flow of air past said bit and through a forward portion of said shroud to withdraw chips by vacuum from the location of the bit to a collection location;
said body containing at least one air exhaust opening for discharging air from the motor into said rear portion of the shroud; and
seal means for forming a fluid tight seal between said body and said shroud at a location forwardly of said air exhaust opening in the body and rearwardly of said flow of air and chips through the shroud.

10. A drill as recited in claim 9, in which said seal means includes an elastomeric ring forming said seal between the body and shroud forwardly of said exhaust opening, there being an additional seal ring forming a seal between said shroud and body rearwardly of said exhaust opening, said shroud being apertured axially between said two seal rings to discharge air from the motor to atmosphere.

11. A drill as recited in claim 9, in which said shroud and chuck having annular surfaces forwardly of said seal means received in closely proximate relation preventing movement of chips rearwardly to said seal means.

12. A portable drill comprising:
a body containing a motor;
a rotary chuck driven by said motor and adapted to hold a drill bit at a forward end of the body, and to turn the bit about an axis;
a shroud disposed about said chuck at said forward end of said body;
a chip receptacle removably carried by said body at an opposite rear end of the body, rearwardly beyond said motor;
a handle projecting from said body intermediate said shroud and said receptacle; and
means for producing a flow of air and entrained chips from the vicinity of said drill bit through said shroud and then rearwardly to said receptacle;
said receptacle being cup shaped, containing a chamber for receiving chips, having an open end engageable in sealing relation with said body and being formed of two similar cups spaced apart to define a passage therebetween through which air from said aspirator passages flows to said open end of the receptacle for discharge to atmosphere;
said means for producing said flow of air including a first tube carried by said body and projecting therefrom into said receptacle and through which a primary flow of air is discharged, a second tube carried by said receptacle and telescopically interfitting with said first tube to receive air therefrom, means forming aspirator passages in said receptacle energized by said primary flow of air from said tubes to withdraw air from said chamber and thereby induce said first mentioned flow of air and chips from the bit to said receptacle; and
filter means in the receptacle between said chamber and said aspirator passages.

13. A drill as recited in claim 12, in which said motor is driven by compressed air and has an air exhaust opening discharging into an apertured rear portion of said shroud, there being two spaced seal rings carried by said body and engageable with said shroud, one of said seal rings being located forwardly of said exhaust opening and the other rearwardly of said exhaust opening, said means for producing said flow of air and chips including a chip delivery tube carried by said shroud and projecting rearwardly therefrom, and means forming a forwardly facing socket recess carried by said body and communicating with said receptacle and adapted to telescopically receive said chip delivery tube in sealed relation upon rearward movement of the shroud.

14. A drill as recited in claim 13, including a sleeve carried by said shroud about said drill bit and spring urged forwardly relative to the shroud, and at least one lug projecting inwardly from said sleeve toward the bit to break up cuttings, said sleeve having a side wall containing elongated generally transverse and inclined air entrance slits forwardly of said lug.

15. A portable drill comprising:
a body containing a motor;
a rotary chuck driven by said motor and adapted to hold a drill bit at a forward end of the body, and to turn the bit about an axis;
a shroud disposed about said chuck at said forward end of said body;
a chip receptacle removably carried by said body at an opposite rear end of the body, rearwardly beyond said motor;
a handle projecting from said body intermediate said shroud and said receptacle;
means for producing a flow of air and entrained chips from the vicinity of said drill bit through said shroud and then rearwardly to said receptacle; and a generally U-shaped retainer having arms connected pivotally to opposite sides of said shroud and having a cross piece adapted to swing to a position behind said receptacle for retaining said receptacle and shroud against relative axial separation.

16. A drill comprising:

a body containing a motor;

a rotary chuck driven by said motor and adapted to hold a drill bit and turn it about an axis; and a chip a receptacle removably carried by said body;

said receptacle being cup shaped and having an open end received in annularly sealed relation with respect to said body, and having an opposite closed end containing aspirator passages responsive to a primary flow of air to induce a secondary flow of air and entrained chips from the location of said bit into a chamber in the receptacle, said receptacle further including two similar cups with side and end walls spaced apart to form a passage therebetween through which air flows from said aspirator passages to said open end of said receptacle for discharge at that location to the atmosphere.

17. A portable drill comprising:

a body containing a motor;

a rotary chuck driven by said motor and adapted to hold a drill bit at a forward end of the body, and to turn the bit about an axis;

a shroud disposed about said chuck and drill bit at said forward end of said body;

a chip receptacle removably carried by said body at an opposite rear end of the body, rearwardly beyond said motor, said receptacle being cup shaped and containing a chamber for receiving chips and having an open end engageable in sealing relation with said body;

a handle projecting from said body intermediate said shroud and said receptacle; and means for producing a flow of air and entrained chips from the vicinity of said drill bit through said shroud and then rearwardly to said receptacle, said means for producing a flow including a first tube carried by said body and projecting therefrom into said receptacle and through which a primary flow of air is discharged, a second tube carried by said receptacle and telescopically interfitting with said first tube to receive air therefrom, means forming aspirator passages in said receptacle energized by said primary flow of air from said tubes to withdraw air from said chamber and thereby induce said first mentioned flow of air and chips from the bit to said receptacle, and filter means in the receptacle between said chamber and said aspirator passages.

18. A drill comprising:

a body;

a motor carried by said body;

a rotary chuck driven by said motor and adapted to hold a drill bit and turn it about an axis;

a shroud carried by said body and disposed about said chuck;

a sleeve mounted to and adapted for axial movement relative to said shroud at a location to extend about the entirety of said drill bit, said sleeve having a side wall containing elongated slits through which said flow of air enters the sleeve, said elongated slits having their lengths disposed generally transversely of said axis and being inclined to advance progressively in a rearward axial direction as they advance radially inwardly toward the bit;

means yieldingly urging said sleeve in a forward direction relative to said shroud;

means for producing a flow of air through said sleeve acting to withdraw chips by vacuum along a predetermined path from the location of the bit to a collection location; and a plurality of lugs carried by said sleeve rearward of said slits and projecting inwardly at circularly spaced locations toward the bit and operable to engage and break up chips produced by the bit to facilitate their removal by said flow of air.

* * * * *